(12) United States Patent
Sayers

(10) Patent No.: US 9,080,739 B1
(45) Date of Patent: Jul. 14, 2015

(54) SYSTEM FOR PRODUCING A SLENDER ILLUMINATION PATTERN FROM A LIGHT EMITTING DIODE

(75) Inventor: Wilston Nigel Christopher Sayers, Atlanta, GA (US)

(73) Assignee: Cooper Technologies Company, Houston, TX (US)

( * ) Notice: Subject to any disclaimer, the term of this patent is extended or adjusted under 35 U.S.C. 154(b) by 106 days.

(21) Appl. No.: 13/616,999

(22) Filed: Sep. 14, 2012

(51) Int. Cl.
| F21V 5/00 | (2006.01) |
| F21V 5/08 | (2006.01) |
| F21V 5/04 | (2006.01) |
| F21W 111/02 | (2006.01) |
| F21W 111/023 | (2006.01) |

(52) U.S. Cl.
CPC ... *F21V 5/00* (2013.01); *F21V 5/08* (2013.01); *F21V 5/04* (2013.01); *F21V 5/048* (2013.01); *F21W 2111/02* (2013.01); *F21W 2111/023* (2013.01)

(58) Field of Classification Search
CPC .......... F21V 5/04; F21V 5/041; F21V 5/043; F21V 5/046; F21V 5/048; F21V 7/09; F21V 7/06; F21V 7/045; F21V 7/0066; F21W 2111/027; F21W 2131/2131
USPC ................................ 362/245, 248, 307, 308, 362/311.07–311.09, 328, 334–335, 362/347–350
See application file for complete search history.

(56) References Cited

U.S. PATENT DOCUMENTS

| 1,706,177 A | * | 3/1929 | Martin ........................... 362/338 |
| 2,254,961 A | | 9/1941 | Harris |
| 2,394,992 A | | 2/1946 | Franck |
| 2,908,197 A | | 10/1959 | Wells et al. |
| 3,596,136 A | | 7/1971 | Fischer |
| 3,647,148 A | | 3/1972 | Wince |
| 3,927,290 A | | 12/1975 | Denley |
| 4,270,162 A | * | 5/1981 | Cherouge ................ 362/311.07 |
| 4,345,308 A | | 8/1982 | Mouyard et al. |
| 4,460,945 A | | 7/1984 | Chan |
| 4,729,076 A | | 3/1988 | Masami |
| 4,734,836 A | | 3/1988 | Negishi |

(Continued)

FOREIGN PATENT DOCUMENTS

| CN | 2750186 | 1/2006 |
| CN | 1737418 | 2/2006 |

(Continued)

OTHER PUBLICATIONS

Streetworks fixture from Cooper Lighting and 2 IES files, Aug. 14, 2001.

(Continued)

*Primary Examiner* — Peggy Neils
*Assistant Examiner* — Zheng Song
(74) *Attorney, Agent, or Firm* — King & Spalding LLP

(57) ABSTRACT

An optic can receive light from a dome of a light emitting diode and output light that, when cast upon a nearby flat surface, forms a strip of illumination. The optic can comprise a cavity that receives the light from the dome and an outer surface that emits the received light. An edge of the cavity can extend peripherally around the cavity in an oblong geometry. An edge of the outer surface can extend peripherally around the outer surface in an oblong geometry that is rotated ninety degrees relative to the oblong geometry of the cavity. A sidewall of the outer surface can comprise a region that is concave in nature or sags.

18 Claims, 13 Drawing Sheets

(56) References Cited

U.S. PATENT DOCUMENTS

| | | |
|---|---|---|
| 4,860,177 A | 8/1989 | Simms |
| 4,907,044 A | 3/1990 | Schellhorn et al. |
| 4,941,072 A | 7/1990 | Yasumoto et al. |
| 5,636,057 A | 6/1997 | Dick et al. |
| 5,782,555 A | 7/1998 | Hochstein |
| 5,857,767 A | 1/1999 | Hochstein |
| 5,924,788 A | 7/1999 | Parkyn, Jr. |
| 5,939,996 A | 8/1999 | Kniveton et al. |
| 6,045,240 A | 4/2000 | Hochstein |
| 6,050,707 A | 4/2000 | Kondo et al. |
| 6,102,558 A | 8/2000 | Farnoux |
| 6,227,684 B1 | 5/2001 | Wijbenga |
| 6,227,685 B1 | 5/2001 | McDermott |
| 6,273,596 B1 | 8/2001 | Parkyn, Jr. |
| 6,441,558 B1 | 8/2002 | Muthu et al. |
| 6,461,008 B1 | 10/2002 | Pederson |
| 6,502,956 B1 | 1/2003 | Wu |
| 6,527,422 B1 | 3/2003 | Hutchison |
| 6,536,923 B1 | 3/2003 | Merz |
| 6,560,038 B1 | 5/2003 | Parkyn et al. |
| 6,582,103 B1 | 6/2003 | Popovich et al. |
| 6,598,998 B2 | 7/2003 | West et al. |
| 6,639,733 B2 | 10/2003 | Minano |
| 6,784,357 B1 | 8/2004 | Wang |
| 6,785,053 B2 | 8/2004 | Savage, Jr. |
| 6,837,605 B2 | 1/2005 | Reill |
| 6,850,001 B2 | 2/2005 | Takekuma |
| 6,895,334 B2 | 5/2005 | Yabe |
| 6,942,361 B1 | 9/2005 | Kishimura et al. |
| 6,948,838 B2 | 9/2005 | Kunstler |
| 6,965,715 B2 | 11/2005 | Lei |
| 6,997,580 B2 | 2/2006 | Wong |
| 7,070,310 B2 | 7/2006 | Pond et al. |
| 7,073,931 B2 | 7/2006 | Ishida |
| 7,090,370 B2 | 8/2006 | Clark |
| 7,102,172 B2 | 9/2006 | Lynch et al. |
| 7,104,672 B2 | 9/2006 | Zhang |
| 7,153,015 B2 | 12/2006 | Brukilacchio |
| 7,172,319 B2 | 2/2007 | Holder |
| 7,181,378 B2 | 2/2007 | Benitez |
| 7,204,627 B2 | 4/2007 | Hishida |
| 7,237,936 B1 | 7/2007 | Gibson |
| 7,278,761 B2 | 10/2007 | Kuan |
| 7,281,820 B2 | 10/2007 | Bayat et al. |
| 7,322,718 B2 | 1/2008 | Setomoto et al. |
| D563,036 S | 2/2008 | Miyairi et al. |
| 7,329,029 B2 | 2/2008 | Chaves et al. |
| 7,329,030 B1 | 2/2008 | Wang |
| 7,329,033 B2 | 2/2008 | Glovatsky |
| 7,339,200 B2 | 3/2008 | Amano et al. |
| 7,347,599 B2 | 3/2008 | Minano et al. |
| 7,348,604 B2 | 3/2008 | Matheson |
| 7,348,723 B2 | 3/2008 | Yamaguchi et al. |
| 7,352,011 B2 | 4/2008 | Smits et al. |
| 7,374,322 B2 | 5/2008 | Steen et al. |
| 7,410,275 B2 | 8/2008 | Sommers et al. |
| D577,852 S | 9/2008 | Miyairi et al. |
| 7,460,985 B2 | 12/2008 | Benitez |
| 7,461,948 B2 | 12/2008 | Van Voorst Vader et al. |
| 7,507,001 B2 | 3/2009 | Kit |
| 7,513,639 B2 | 4/2009 | Wang |
| 7,569,802 B1 | 8/2009 | Mullins |
| 7,572,027 B2 | 8/2009 | Zampini, II |
| 7,572,654 B2 | 8/2009 | Chang |
| 7,575,354 B2 | 8/2009 | Woodward |
| 7,582,913 B2 | 9/2009 | Huang et al. |
| 7,618,162 B1 | 11/2009 | Parkyn et al. |
| 7,618,163 B2 | 11/2009 | Wilcox |
| 7,625,102 B2 | 12/2009 | Koike et al. |
| 7,637,633 B2 | 12/2009 | Wong |
| 7,651,240 B2 | 1/2010 | Bayat et al. |
| 7,674,018 B2 | 3/2010 | Holder et al. |
| 7,748,872 B2 | 7/2010 | Holder et al. |
| 7,775,679 B2 | 8/2010 | Thrailkill et al. |
| 7,777,405 B2 | 8/2010 | Steen et al. |
| 7,809,237 B2 | 10/2010 | Pozdnyakov et al. |
| 7,841,750 B2 | 11/2010 | Wilcox et al. |
| 7,942,559 B2 | 5/2011 | Holder |
| 7,972,035 B2 | 7/2011 | Boyer |
| 7,972,036 B1 | 7/2011 | Schach et al. |
| 7,993,036 B2 | 8/2011 | Holder et al. |
| 8,007,140 B2 | 8/2011 | Zhang et al. |
| 8,025,428 B2 | 9/2011 | Duguay et al. |
| 8,210,722 B2 | 7/2012 | Holder et al. |
| 2002/0034081 A1 | 3/2002 | Serizawa |
| 2002/0196623 A1 | 12/2002 | Yen |
| 2003/0067787 A1 | 4/2003 | Serizawa |
| 2003/0099115 A1 | 5/2003 | Reill |
| 2004/0037076 A1 | 2/2004 | Katoh et al. |
| 2004/0070855 A1 | 4/2004 | Benitez et al. |
| 2004/0105171 A1 | 6/2004 | Minano et al. |
| 2004/0105261 A1 | 6/2004 | Ducharme |
| 2004/0105264 A1 | 6/2004 | Spero |
| 2004/0189933 A1 | 9/2004 | Sun et al. |
| 2004/0207999 A1 | 10/2004 | Suehiro et al. |
| 2004/0218388 A1 | 11/2004 | Suzuki |
| 2004/0222947 A1 | 11/2004 | Newton et al. |
| 2004/0228127 A1 | 11/2004 | Squicciarini |
| 2005/0073849 A1 | 4/2005 | Rhoads et al. |
| 2005/0207165 A1 | 9/2005 | Shimizu et al. |
| 2006/0034082 A1 | 2/2006 | Park |
| 2006/0039143 A1 | 2/2006 | Katoh |
| 2006/0081863 A1 | 4/2006 | Kim et al. |
| 2006/0083003 A1 | 4/2006 | Kim et al. |
| 2006/0138437 A1 | 6/2006 | Huang et al. |
| 2006/0238884 A1 | 10/2006 | Jang |
| 2006/0245083 A1 | 11/2006 | Chou et al. |
| 2006/0250803 A1 | 11/2006 | Chen |
| 2006/0255353 A1 | 11/2006 | Taskar |
| 2006/0285311 A1 | 12/2006 | Chang et al. |
| 2007/0019415 A1 | 1/2007 | Leblanc |
| 2007/0019416 A1 | 1/2007 | Han |
| 2007/0058369 A1 | 3/2007 | Parkyn et al. |
| 2007/0063210 A1 | 3/2007 | Chiu |
| 2007/0076414 A1 | 4/2007 | Holder |
| 2007/0081338 A1 | 4/2007 | Kuan |
| 2007/0081340 A1 | 4/2007 | Chung et al. |
| 2007/0091615 A1 | 4/2007 | Hsieh et al. |
| 2007/0183736 A1 | 8/2007 | Pozdnyakov |
| 2007/0201225 A1 | 8/2007 | Holder |
| 2007/0258214 A1 | 11/2007 | Shen |
| 2008/0013322 A1 | 1/2008 | Ohkawa |
| 2008/0019129 A1 | 1/2008 | Wang |
| 2008/0025044 A1 | 1/2008 | Park et al. |
| 2008/0043473 A1 | 2/2008 | Matsui |
| 2008/0055908 A1 | 3/2008 | Wu |
| 2008/0068799 A1 | 3/2008 | Chan |
| 2008/0080188 A1 | 4/2008 | Wang |
| 2008/0100773 A1* | 5/2008 | Hwang et al. ............... 349/62 |
| 2008/0174996 A1 | 7/2008 | Lu |
| 2008/0239722 A1 | 10/2008 | Wilcox |
| 2008/0273327 A1 | 11/2008 | Wilcox et al. |
| 2009/0244895 A1 | 10/2009 | Chen |
| 2009/0262532 A1* | 10/2009 | Wilcox et al. ................ 362/248 |
| 2009/0262543 A1 | 10/2009 | Ho |
| 2010/0014290 A1 | 1/2010 | Wilcox |
| 2010/0039810 A1* | 2/2010 | Holder et al. ................ 362/235 |
| 2010/0232166 A1* | 9/2010 | Ho et al. ..................... 362/335 |
| 2011/0051427 A1* | 3/2011 | Zhang ..................... 362/311.08 |
| 2011/0058380 A1* | 3/2011 | Ho et al. ..................... 362/335 |
| 2011/0080745 A1* | 4/2011 | Chen ........................... 362/335 |
| 2011/0205744 A1* | 8/2011 | Kim ........................ 362/296.01 |
| 2011/0317432 A1* | 12/2011 | Lee ............................ 362/335 |
| 2012/0014116 A1* | 1/2012 | Hu ............................ 362/335 |
| 2012/0057354 A1* | 3/2012 | Lee et al. ................. 362/311.09 |
| 2012/0120666 A1* | 5/2012 | Moeller ....................... 362/308 |
| 2013/0083541 A1* | 4/2013 | Fang et al. ............... 362/311.02 |
| 2013/0114022 A1* | 5/2013 | Iiyama et al. ................. 349/64 |
| 2013/0223072 A1* | 8/2013 | Castillo ....................... 362/245 |
| 2014/0126218 A1* | 5/2014 | Lin et al. ................. 362/311.02 |

(56) References Cited

U.S. PATENT DOCUMENTS

FOREIGN PATENT DOCUMENTS

| DE | 202006015981 | 1/2007 |
|---|---|---|
| EP | 1431653 | 6/2004 |
| GB | 718425 | 11/1954 |
| GB | 794670 | 5/1958 |
| GB | 815609 | 7/1959 |
| JP | 06-177424 | 6/1994 |
| JP | 11/154766 | 9/1997 |
| JP | 2001-517855 | 9/1998 |
| JP | 2005-062461 | 3/2005 |
| KR | 10-2006-0033572 | 4/2006 |
| KR | 10-2006-0071033 | 6/2006 |
| WO | WO 9624802 | 8/1996 |
| WO | WO 98/33007 | 7/1998 |
| WO | WO 03044870 | 5/2003 |
| WO | WO 2004/068909 | 8/2004 |
| WO | WO 2005/041254 | 5/2005 |
| WO | WO 2005/057082 | 6/2005 |
| WO | WO 2005/093316 | 10/2005 |
| WO | WO 2007/100837 | 9/2007 |
| WO | WO 2008/144672 | 11/2008 |
| WO | WO 2010/019810 | 2/2010 |
| WO | WO 2011/098515 | 8/2011 |

OTHER PUBLICATIONS

Bisberg, *LED Magazine*, The 5mm. Package Versus the Power LED: Not a Light choice for the Luminaire Designer, pp. 19-21, Dec. 2005.
*LED Magazine*, p. 36 Oct. 2005.
International Search Report and Written Opinion for WO 2010/019810 mailed Sep. 30, 2009.
International Search Report and Written Opinion for WO 2008/144672 mailed Nov. 27, 2008.
ISR and Written Opinion of ISA, PCT/US07/05118 mailed Mar. 11, 2008.
Bortz, "Optimal Design of a Non imaging Projection Lens for Use with an LED Light Source and a Rectangular Sheet." SPIE, pp. 130-138, vol. 4092, USA, published 2000.
International Search Report for PCT/US08/64168 mailed on Aug. 15, 2008.
Extended Search Report for EP Application No. 11006191 mailed Nov. 7, 2011.
Extended Search Report for EP Application No. 11006189 mailed Nov. 7, 2011.
Extended Search Report for EP Application No. 11006190 mailed Nov. 7, 2011.
Ries, Harold & Julius Muschaweck, *Tailored Freeform Optical Surfaces*, Optical Society of America, vol. 19, No. 3, Mar. 2002.
Extended Search Report for EP Application No. 08755907.6 mailed May 10, 2012.
Jolley L.B.W. et al., The Therory and Design of Illuminating Engineering Equipment, 1931.
Order; Case No. 11-CV-34-JPS; United States District Court Eastern District of Wisconsin; Jun. 8, 2012; (referencing U.S. Patent Nos. 7,674,018 and 7,993,036).
International Search Report for PCT/US11/049388 mailed on Apr. 9, 2012.
Timinger, Andreas, Strategies Unlimited, "Charting New Directions in High-Brightness LED's ," Strategies in Light, Feb. 5-7, 2005.
Timinger, Andreas, "Optical Design for LED-Street Lamps," Conference Paper, Solid-State and Organic Lighting (SOLED), Karlsruhe, Germany, Jun. 21, 2010.
Order, Case No. 11-CV-34-JPS; United States District Court Eastern District of Wisconsin; filed Oct. 31, 2012.
LED's Magazine; High-Power LED's; multi-watt LED light Engines Offer Challenges and Opportunities; ledmagazine.com Oct. 2005.
Timinger, "Tailored Optical Surfaces Step up Illumination Design," Europhonics; Aug./Sep. 2002 (color copy).
Plantiff Illumination Management Solutions, Inc.'s Initial Claim Construction Brief; Case No. 2:11-cv-00034 JPS; Apr. 5, 2012.
Ruud Lighting's Notice Pursuant to 35 U.S.C. §282; Civil Action 2:11-cv-00034-JPS; Oct. 12, 2012.
Aoyama, Y.; Yachi, T., "An LED Module Array System Designed for Streetlight Use," Energy 2030 Conference, 2008. Energy 2008. IEEE, vol., No., pp. 1-5, Nov. 17-18, 2008, doi: 10.1109/ENERGY.2008.4780996; URL: http://ieeexplore.ieee.org/stamp/stamp.jsp?tp=&arnumber=4780996&isnumber=4780986.
Petroski, J.; Norley, J.; Schober, J.; Reis, B.; Reynolds, R.A.; , "Conduction cooling of large LED array systems," Thermal and Thermomechanical Phenomena in Electronic Systems (ITherm), 2010 12th IEEE Intersociety Conference on , vol., No., pp. 1-10, Jun. 2-5, 2010; doi: 10.1109/ITHERM.2010.5501350; URL: http://ieeexplore.ieee.org/stamp/stamp.jsp?tp=&arnumber=5501350&isnumber=5501251.
Wankhede, M.; Khaire, V.; Goswami, A.; Mahajan, S.D.; , "Evaluation of Cooling Solutions for Out-door Electronics," Electronics Packaging Technology Conference, 2007. EPTC 2007. 9th , vol., No., pp. 858-863, Dec. 10-12, 2007; doi: 10.1109/EPTC.2007.4469682; URL: http://ieeexplore.ieee.org/stamp/stamp.jsp?tp=&arnumber=4469682&isnumber=4469670.

\* cited by examiner

| PARABOLA SPLINE POINTS SECTION E1 ||
|---|---|
| X | Y |
| 0.0000 | -0.28000 |
| 0.0118 | -0.28184 |
| 0.0236 | -0.28736 |
| 0.0354 | -0.29639 |
| 0.0471 | -0.30836 |
| 0.0589 | -0.32235 |
| 0.0707 | -0.33724 |
| 0.0825 | -0.35193 |
| 0.0943 | -0.36551 |
| 0.1061 | -0.37740 |
| 0.1179 | -0.38726 |
| 0.1296 | -0.39499 |
| 0.1414 | -0.40060 |
| 0.1532 | -0.40418 |
| 0.1650 | -0.40587 |

| PARABOLA SPLINE POINTS SECTION E2 ||
|---|---|
| X | Y |
| 0.0000 | 0.00000 |
| 0.0323 | -0.00090 |
| 0.0646 | -0.00346 |
| 0.0969 | -0.00760 |
| 0.1292 | -0.01330 |
| 0.1614 | -0.02063 |
| 0.1937 | -0.02974 |
| 0.2260 | -0.04084 |
| 0.2583 | -0.05427 |
| 0.2906 | -0.07054 |
| 0.3229 | -0.09050 |
| 0.3552 | -0.11560 |
| 0.3875 | -0.14885 |
| 0.4198 | -0.19893 |
| 0.4521 | -0.31587 |

| PARABOLA SPLINE POINTS SECTION F1 | |
|---|---|
| X | Y |
| 0.0000 | -0.28000 |
| 0.0179 | -0.28093 |
| 0.0357 | -0.28345 |
| 0.0536 | -0.28724 |
| 0.0714 | -0.29209 |
| 0.0893 | -0.29784 |
| 0.1071 | -0.30436 |
| 0.1250 | -0.31156 |
| 0.1429 | -0.31936 |
| 0.1607 | -0.32770 |
| 0.1786 | -0.33654 |
| 0.1964 | -0.39581 |
| 0.2143 | -0.35549 |
| 0.2321 | -0.36553 |
| 0.2500 | -0.37587 |

| PARABOLA SPLINE POINTS SECTION F2 | |
|---|---|
| X | Y |
| 0.0000 | 0.00000 |
| 0.0233 | -0.00275 |
| 0.0465 | -0.01116 |
| 0.0698 | -0.02528 |
| 0.0931 | -0.04482 |
| 0.1163 | -0.06905 |
| 0.1396 | -0.09678 |
| 0.1629 | -0.12653 |
| 0.1861 | -0.15672 |
| 0.2094 | -0.18596 |
| 0.2326 | -0.21313 |
| 0.2559 | -0.23804 |
| 0.2792 | -0.26211 |
| 0.3024 | -0.28705 |
| 0.3257 | -0.31587 |

| PARABOLA SPLINE POINTS L1 | |
|---|---|
| X | Y |
| 0.0000 | 0.25000 |
| 0.0118 | 0.24968 |
| 0.0236 | 0.24865 |
| 0.0354 | 0.24683 |
| 0.0471 | 0.24409 |
| 0.0589 | 0.24031 |
| 0.0707 | 0.23528 |
| 0.0825 | 0.22875 |
| 0.0943 | 0.22037 |
| 0.1061 | 0.20963 |
| 0.1179 | 0.19571 |
| 0.1296 | 0.17722 |
| 0.1414 | 0.15130 |
| 0.1532 | 0.10996 |
| 0.1650 | 0.00000 |

| PARABOLA SPLINE POINTS L2 | |
|---|---|
| X | Y |
| 0.0000 | 0.32570 |
| 0.0323 | 0.32521 |
| 0.0646 | 0.32368 |
| 0.0969 | 0.32101 |
| 0.1292 | 0.31706 |
| 0.1614 | 0.31167 |
| 0.1937 | 0.30461 |
| 0.2260 | 0.29558 |
| 0.2583 | 0.28417 |
| 0.2906 | 0.26978 |
| 0.3229 | 0.25150 |
| 0.3552 | 0.22777 |
| 0.3875 | 0.19555 |
| 0.4198 | 0.14701 |
| 0.4521 | 0.00000 |

SECTION D-D

DETAIL B

SECTION A-A

DETAIL C

SYSTEM FOR PRODUCING A SLENDER ILLUMINATION PATTERN FROM A LIGHT EMITTING DIODE

FIELD OF THE TECHNOLOGY

The present technology relates to managing light emitted by one or more light emitting diodes ("LEDs"), and more specifically to an optical element that can cast an elongated illumination distribution from such emitted light, for example to illuminate a pathway.

BACKGROUND

Light emitting diodes are useful for indoor and outdoor illumination, as well as other applications. Many such applications would benefit from an improved technology for managing light produced by a light emitting diode, such as forming an illumination distribution matched or tailored to application parameters.

For example, consider lighting a pathway having a thin, rectangular geometry. Conventional light emitting diodes could be mounted over the sidewalk, facing down, so that the optical axes of the individual light emitting diodes point towards the sidewalk. In this configuration, each conventional light emitting diode would cast a substantially circular illumination distribution poorly matched to the rectangular geometry of the pathway. A linear array of such light emitting diodes would undesirably cast a substantial amount of light outside the pathway or provide a splotchy pattern of uneven illumination on the pathway.

In view of the foregoing discussion of representative shortcomings in the art, need for improved light management is apparent. Need exists for a compact apparatus to manage light emitted by a light emitting diode. Need further exists for an economical apparatus to manage light emitted by a light emitting diode. Need further exists for a technology that can efficiently manage light emitted by a light emitting diode, resulting in energy conservation. Need further exists for an optical device that can transform light emanating from a light emitting diode into a desired distribution, for example creating a pattern that is long and narrow, elongate, linear in form, or ribbon shaped. Need exists for improved lighting, including for lighting pathways, walkways, aisles, emergency paths, and sidewalks, to mention a few representative examples. A capability addressing one or more such needs, or some other related deficiency in the art, would support cost effective deployment of light emitting diodes in lighting and other applications.

SUMMARY

An apparatus can process light emitted by one or more light emitting diodes to form a desired illumination distribution, for example converting light having diverse ray orientation into a long slender distribution of illumination.

In one aspect of the present technology, a lighting system can comprise a light emitting diode and an optic positioned to process light emitted by the light emitting diode. The optic can comprise a cavity that faces the light emitting diode and receives light from the light emitting diode and an outer surface that faces away from the light emitting diode and that emits the light received from the light emitting diode. The cavity can be elongated in a first dimension. The outer surface can be elongated in a second dimension, opposite or perpendicular to the first dimension. For example, an inner surface of the cavity and the outer surface can be stretched in opposing or perpendicular directions. Lengthened aspects of the inner and outer surfaces may be rotated approximately ninety degrees relative to one another, or some other appropriate amount.

In another aspect, an optic that is coupled to a light emitting diodes can comprise an outer surface that bulges outward and thus may be viewed as globally convex. The optic can comprise an off-axis indentation that may be viewed as a region that is locally concave.

The foregoing discussion of managing light is for illustrative purposes only. Various aspects of the present technology may be more clearly understood and appreciated from a review of the following detailed description of the disclosed embodiments and by reference to the drawings and the claims that follow. Moreover, other aspects, systems, methods, features, advantages, and objects of the present technology will become apparent to one with skill in the art upon examination of the following drawings and detailed description. It is intended that all such aspects, systems, methods, features, advantages, and objects are to be included within this description, are to be within the scope of the present technology, and are to be protected by the accompanying claims.

BRIEF DESCRIPTION OF THE DRAWINGS

FIG. 4, are polar plots of illumination emitted by an optic that manages light emitted by a light emitting diode according to certain exemplary embodiments of the present technology.

FIG. 7, are views of an optic in the short axis, for managing light emitted by a light emitting diode, illustrating profiles in a cross sectional plane according to certain exemplary embodiments of the present technology.

FIG. 9A is a cross sectional view of the optic taken across the line E-E of FIG. 8 according to certain exemplary embodiments of the present technology.

FIGS. 9B and 9C are tables respectively describing inner and outer profiles of the cross section taken across the line E-E of FIG. 8 according to certain exemplary embodiments of the present technology.

FIG. 10A is a cross sectional view of the optic taken across the line F-F of FIG. 8 according to certain exemplary embodiments of the present technology. FIGS. 10B and 10C are tables respectively describing inner and outer profiles of the cross section taken across the line F-F of FIG. 8 according to certain exemplary embodiments of the present technology.

FIG. 11A is a plan view showing profile edges according to certain exemplary embodiments of the present technology. FIGS. 11B and 11C are tables respectively describing edges of inner and outer surfaces of the optic according to certain exemplary embodiments of the present technology.

Figure 1:
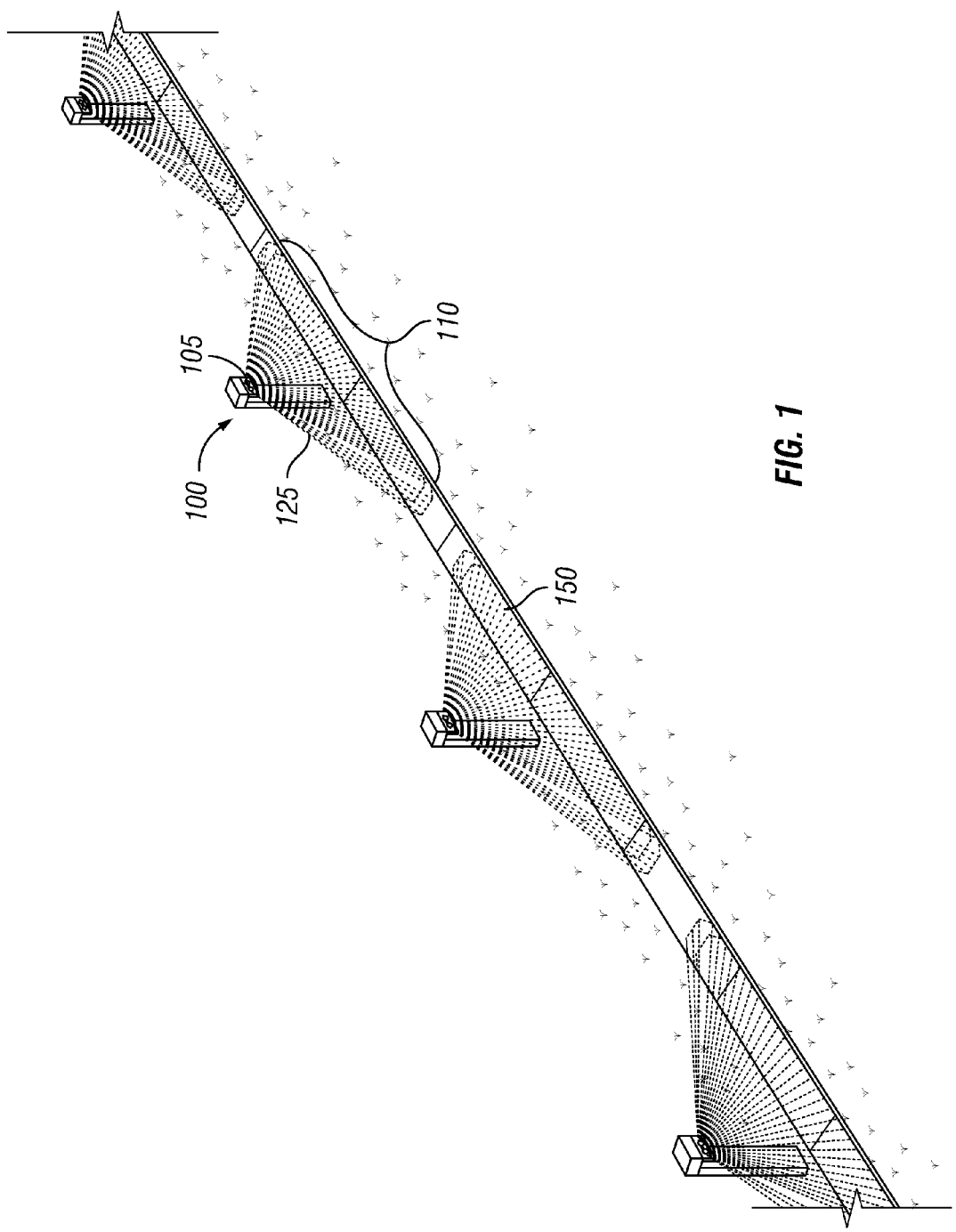
FIG. 1 is an illustration of a pathway lit by an illumination system comprising light emitting diodes according to certain exemplary embodiments of the present technology.

Many aspects of the technology can be better understood with reference to the above drawings. The elements and features shown in the drawings are not to scale, emphasis instead being placed upon clearly illustrating the principles of exemplary embodiments of the present technology. Moreover, certain dimensions may be exaggerated to help visually convey such principles. In the drawings, reference numerals designate like or corresponding, but not necessarily identical, elements throughout the several views.

DESCRIPTION OF EXEMPLARY EMBODIMENTS

A light generator can emit light. In certain embodiments, the light source can be or comprise one or more light emitting diodes. The light generator can emit light that presents a circular or elliptical (that may be Lambertian) illumination distribution on an illuminated surface. With an appropriately configured optic, the light generator can be deployed in applications where a more elongated or linear illumination distribution is desired. The optic can process light emitted by the light generator to provide a different illumination distribution on the surface, such as transforming the circular illumination distribution into an elongated illumination distribution or further elongating the elliptical pattern. For example, light generated by a light emitting diode can be linearized or converted into a narrow strip or ribbon of illumination.

In certain embodiments, such an optic can receive light from a dome of a light emitting diode and output light that forms a long slender pattern of illumination on a nearby surface such as a pathway. The optic can comprise a cavity that receives the light from the dome and an outer surface that emits the received light. An edge of the cavity can extend peripherally around the cavity in an oblong geometry. An edge of the outer surface can extend peripherally around the outer surface of the optic in an oblong geometry that is rotated relative to the oblong geometry of the cavity. The rotation can be about ninety degrees in certain embodiments, or some other appropriate shift in angular orientation. A sidewall of the outer surface can comprise a locally concave region or a region that sags.

Figure 2:
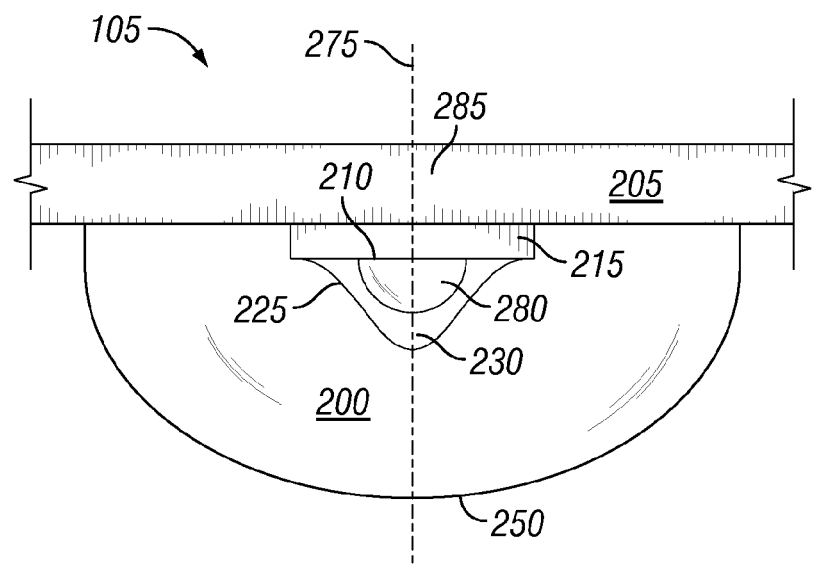
FIG. 2 is an illustration of a light source comprising a light emitting diode and an associated optic for managing light emitted by the light emitting diode according to certain exemplary embodiments of the present technology.

Technology for managing light emitted by a light emitting diode or other light source will now be described more fully with reference to FIGS. 1-18, which describe representative embodiments of the present technology. FIG. 1 describes an illumination system in a representative operating environment or application. FIG. 2 describes the illumination system in further detail, showing a light emitting diode and an associated optic in representative form. FIGS. 3-18 describe a representative form of the optic in further detail.

The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples" or "exemplary embodiments" given herein are intended to be non-limiting and among others supported by representations of the present technology.

Turning now to FIG. 1, this figure illustrates a pathway 150 lit by an exemplary illumination system 100 comprising light emitting diodes in accordance with certain embodiments of the present technology. As illustrated, the illumination system 100 comprises a line of light sources 105, each comprising a pair of light emitting diodes and associated optics. The line of light sources 105 runs parallel with the pathway 150, in this case above the pathway 150. In a typical embodiment, each light source 105 comprises a luminaire with a fixture in which the light emitting diodes are mounted along with an electrical supply, one or more driver circuits, and one or more heat sinks.

Each light source 105 of the illumination system 100 emits light 125 to create on the pathway 150 an illumination pattern 110 having a linear geometry generally matching the linear aspect of the pathway 150. Accordingly, the line of light sources 105 forms a strip of illumination extending along the pathway 150, which may be an outdoor sidewalk, indoor or outdoor walkway, emergency exit path, or other appropriate area benefiting from illumination.

Turning now to FIG. 2, this figure illustrates an exemplary light source 105 comprising an exemplary light emitting diode 285 and an exemplary associated optic 200 for managing light emitted by the light emitting diode 285 in accordance with certain embodiments of the present technology. In an exemplary embodiment, the illustrated light source 105 can be an element of the illumination system 100 illustrated in FIG. 1 and discussed above, and will be discussed in such representative context, without limitation.

In the illustrated embodiment, the light emitting diode 285 and the associated optic 200 are mounted to a substrate 205.

The substrate may comprise a circuit board or a carrier and associated heat sink (not illustrated). In certain embodiments, an array of light emitting diodes 285 and associated optics 200 are provided in a sheet form. Accordingly, in certain embodiments, an illumination system can comprise a two-dimensional array of light sources 105, each configured in accordance with the light source 105 illustrated in exemplary form in FIG. 2 inter alia. The resulting two-dimensional array of light sources can comprise a light module or light bar, one or more of which can be disposed in a luminaire or other lighting apparatus, for example.

Referring to FIG. 2, the light emitting diode 285, which can comprise a light emitting diode package, comprises a substrate 215 and an active area 210 that converts electrical energy into light. The active area 210 can comprise an optoelectronic semiconductor structure or feature on the substrate 215 of the light emitting diode 285, and/or an aperture. A dome 280 covers and protects the active area 210. The dome 280 may comprise optical quality silicone, or some other appropriate material known in the art, that encapsulates the active area 210 and transmits light. Thus, the dome 280 can provide environmental protection to the light emitting diode's semiconductor materials and emit the light that the light emitting diode 285 generates. In many embodiments, the dome 280 emits Lambertian light. Accordingly, the dome 280 may radiate light at highly diverse angles, for example providing a light distribution pattern that can be characterized, modeled, or approximated as Lambertian.

The dome 280 is disposed in a cavity 230 of the optic 200. The dome 280 may project or protrude, partially or fully, into the cavity 230 that the optic 200 forms. The dome 280 may be smaller in volume than the cavity 230. In the illustrated embodiment, an air gap (filled with air, nitrogen, or another suitable gas) exists between the dome 280 and the optic 200, supporting refraction of light transmitting between the dome 280 and the optic 200. In certain embodiments, the air gap can be between about one half of a millimeter and five millimeters. However, other gaps can be utilized.

In certain embodiments (not illustrated), the dome 280 and the optic 200 may optically contact with one another, either via direct, physical contact or by insertion of a glue or gel having an index of refraction that may match the index of refraction of the dome 280, the optic 200, or both the dome 280 and the optic 200. In certain embodiments, the dome 280 is omitted. In certain embodiments (not illustrated), the dome 280 is formed into the optic 200. Thus, the dome 280 may comprise or function as the optic 200.

The optic 200 comprises an inner surface 225 and an outer surface 250. The inner surface 225 receives light emitted by the light emitting diode 285, and the outer surface 250 emits the received light transmitting from the inner surface 225 to the outer surface 250.

As will be discussed in further detail below, the inner and outer surfaces 225 and 250 can be contoured so as to linearize light emitted from the dome 280. In the illustrated embodiment, the inner and outer surfaces 225 and 250 are both refractive, but may also incorporate other light manipulating features, for example reflective. As discussed above, in certain embodiments, the inner surface 225 may be rendered substantially non-operational (from an optical perspective) by addition of an index matching gel. Also as discussed above, in certain embodiments, the outer surface 250 of the optic 200 may be formed directly on the dome 280, and the optic 200 eliminated.

In the illustrated embodiment, the light emitting diode 285 and the optic 200 have a common optical axis 275. However, in certain embodiments, the optical axes 275 may be offset from one another, for example in connection with steering light along the length of the pathway 150 or to one side or the other of the pathway 150. Thus, the light emitting diode 285 and the optic 200 may have concurrent optical axes 275 (as illustrated) or optical axes that are offset in any direction or tilted relative to one another.

The optical axis 275 may be associated with the distribution of light emitting from the light emitting diode 285 and/or associated with physical structure or mechanical features of the light emitting diode 285. The optical axis 275 may be associated with the distribution of light emitting from the optic 200 and/or associated with physical structure or mechanical features of the optic 200.

The term "optical axis," as used herein, generally refers to a reference line along which there is some degree of rotational or other symmetry in an optical system, or a reference line defining a path along which light propagates through a system or after exiting a system. Such reference lines are often imaginary or intangible lines.

Figure 3:
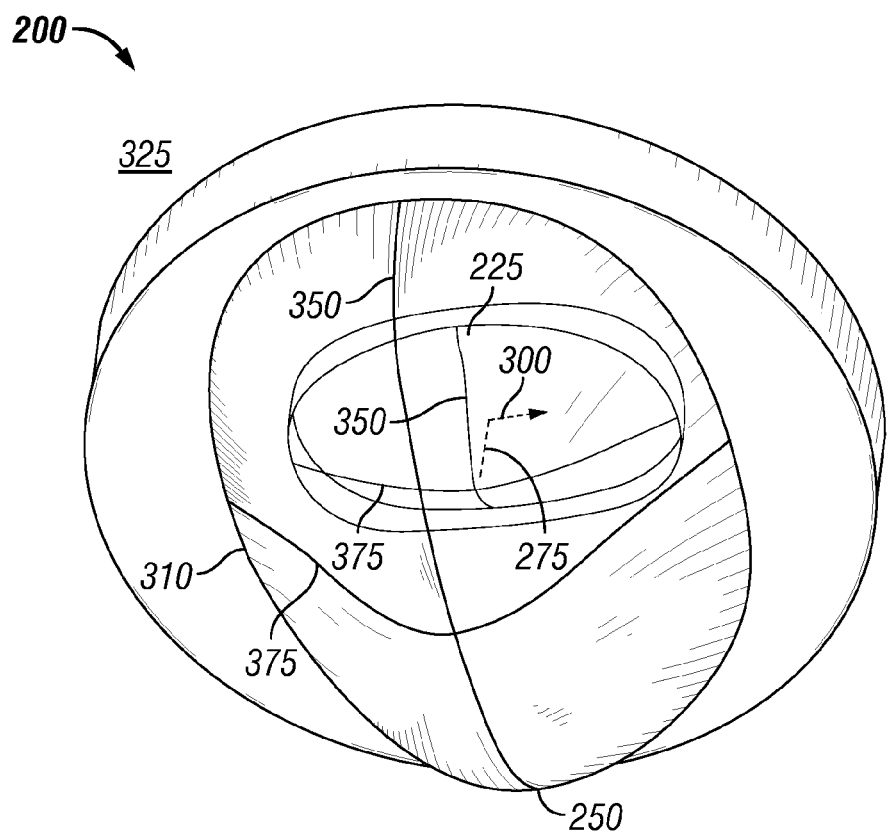
FIG. 3 is a perspective view of an optic, partially transparent, for managing light emitted by a light emitting diode according to certain exemplary embodiments of the present technology.

FIG. 3 is a perspective view of an optic 200 for managing light emitted by a light emitting diode 285 according to certain exemplary embodiments of the present technology. In an exemplary embodiment, the optic 200 of FIG. 3 can be the optic 200 illustrated in FIG. 2 and discussed above, and will be discussed in such representative context, without limitation.

As will be discussed in further detail below, the inner surface 225 of the optic 200 has an elongate dimension, and the outer surface 250 of the optic 200 also has an elongate dimension. In the illustrated embodiment, the elongate dimensions of the inner and outer surfaces 225, 250 are rotated relative to one another, in this case about ninety degrees.

In certain embodiments (not illustrated), the elongate dimensions of the inner and outer surfaces 225, 250 may be rotationally aligned, i.e. extend substantially parallel to one another.

As illustrated in FIG. 3, an edge 310 circumscribes the outer surface 250 of the optic and may be referred to below as the outer edge 310 for convenience. As illustrated, that outer edge 310 is elongated and may have an oval geometry. As will be shown in other figures and discussed below, the inner surface 225 also has a circumscribing edge, which may be referred to as an inner edge, that may be elongate and oval shaped.

Axes 300 for a three-dimensional Cartesian coordinate system have been illustrated with the optic 200, in an arbitrary location, as a discussion aid. The axes 300 thus define three orthogonal planes 325, 350, 375, i.e. planes that are substantially perpendicular to one another.

The plane 325 extends along the base of the optic 200 and thus for convenience of discussion may be referred to below as the base plane 325. FIG. 3 illustrates the base plane 325 as a surface upon which the optic 200 is disposed (upside down, i.e. bottom side up, as it would be mounted in the FIG. 1 application). In certain exemplary embodiments, the base plane 325 is parallel to a planar surface of the substrate 205 and to a planar surface of the pathway 150. The base plane 325 may either include two of the three axes 300 of the Cartesian coordinate system or be displaced below and parallel to them.

The plane 350 extends lengthwise along and through the elongate dimension of the outer surface 250 of the lens 200 and thus for convenience of discussion may be referred to below as the outer plane 350. FIG. 3 illustrates the outer plane 350 as lines where the outer plane 350 intersects the inner and outer surface 225, 250 of the optic 200, along with two of the three axes 300 of the Cartesian coordinate system and the optical axis 275.

For the illustrated optic 200 used in the application and illumination system 100 illustrated in FIG. 1 and discussed above, the outer plane 350 would typically run parallel to the pathway 150 and more typically would extend through the pathway 150 lengthwise. Thus, in certain exemplary embodiments, the outer plane 350 and an output of the light source 105 extend together. However, other embodiments may not share this characteristic.

The plane 375 extends lengthwise along and through the elongate dimension of the inner surface 225 of the lens 200 and thus for convenience of discussion may be referred to below as the inner plane 375. FIG. 3 illustrates the inner plane 375 as lines where the inner plane 375 intersects the inner and outer surface 225, 250 of the optic 200, along with two of the three axes 300 of the Cartesian coordinate system and the optical axis 275.

For the illustrated optic 200 used in the application and illumination system 100 illustrated in FIG. 1 and discussed above, the inner plane 375 would typically extend perpendicular to the pathway 150. Thus, in certain exemplary embodiments, the inner plane 375 and an output of the light source 105 intersect substantially perpendicular to one another. However, other embodiments may not share this characteristic.

In the illustrated embodiment, the outer plane 350 and the inner plane 375 intersect at the optical axis 275. The outer plane 350, the inner plane 375, and the base plane 325 can be characterized as reference planes. As will be appreciated by those of ordinary skill having benefit of this disclosure, a "reference plane" can be thought of as an imaginary or intangible plane providing a useful aid in describing, characterizing, or visualizing something. Although illustrated in a particular position, reference planes can ordinarily be positioned in other locations that may or may not be arbitrary.

In the illustrated embodiment, the outer plane 350 sections the optic 200 into two portions, in this example bisecting the optic 200 into substantially like portions, but in other embodiments the sectioning may be into dissimilar portions. The outer plane 350 may comprise a plane of symmetry for the optic 200 in some embodiments. In the illustrated embodiment, the inner plane 375 sections the optic 200 into two portions, in this example bisecting the optic 200 into substantially like portions, but in other embodiments the sectioning may be into dissimilar portions. The inner plane 375 may comprise a plane of symmetry for the optic 200 in some embodiments.

In certain exemplary embodiments, the optic 200 is a unitary optical element that comprises molded plastic material that is transparent. The optic 200 may comprise poly-methylmethacrylate ("PMMA"), polycarbonate, or an appropriate acrylic, to mention a few representative material options without limitation. In certain exemplary embodiments, the optic 200 can be formed of optical grade silicone and may be pliable and/or elastic, for example.

In certain exemplary embodiments, the optic 200 is a seamless unitary optical element. In certain exemplary embodiments, the optic 200 is formed of multiple transparent optical elements bonded, fused, glued, or otherwise joined together to form a unitary optical element that is void of air gaps yet made of multiple elements.

Turning now to FIG. 4, this figure illustrates exemplary plots 425, 450, 475 of illumination emitted by an optic 200 that manages light emitted by a light emitting diode 285 in accordance with certain embodiments of the present technology. In an exemplary embodiment, the plots 425, 450, 475, which are polar, correspond to the optic 200 illustrated in FIG. 2 and discussed above, and will be discussed in such representative context, without limitation.

The plot 425 represents the illumination distribution 125 when an imaginary horizontal cone intersects azimuthally with the maximum candela value. In this case, the plot closely resembles the illuminance shape casted onto a flat surface facing the optic 200, such as the pathway 150, when viewed from overhead. The plot 425 extends lengthwise along the outer plane 350, with the outer plane 350 substantially bisecting the plot 425. In other words, if overlaid on FIG. 4A, the outer plane 350 would be perpendicular to the page and would include the polar axis that runs up and down the page along the 90° and 270° markers, respectfully. Thus, the plot 425 describes illumination of the light source 105 from the perspective of an observer located on the optical axis 275. The plot 425 illustrates an exemplary result of the optic 200 converting a Lambertian distribution of light into a narrow distribution.

The plot 450 also represents the pattern of light 125 flowing between the optic 200 and the flat surface upon which the illumination pattern 110 is cast, in the form of intensity as a function of angle. The plot 450 represents an imaginary guillotine blade falling vertically from above, intersecting 125 at the maximum candela value. The plot 450 shows this intersection as viewed by an observer situated beside the pathway 150, below the optic 200, and above the pathway 150. The observer could be situated on the inner plane 375 at a point above the base plane 325. Thus, the plot 450 describes the pattern of light 125 of the light source 105 from the perspective of an observer located along the base plane 325 but laterally offset from the pathway 150. If overlaid on FIG. 4A, the inner plane 375 would be perpendicular to the page and would include the polar axis that runs up and down the page.

The peaks in the plot 450 (at 52.5 degrees in this example) provide the location of the maximum intensity vertically. The maximum intensity, vertically at 52.5°, directs more light flux to areas of the pathway 150 that are not directly under the optic 200, since those areas are farther away and receive glancing light rays, effectively lessening the incident illuminance. Thus, elevating the vertical peak intensity compensates for distance and the angle between the distant illuminated surface and the incident rays.

Figure 4A:
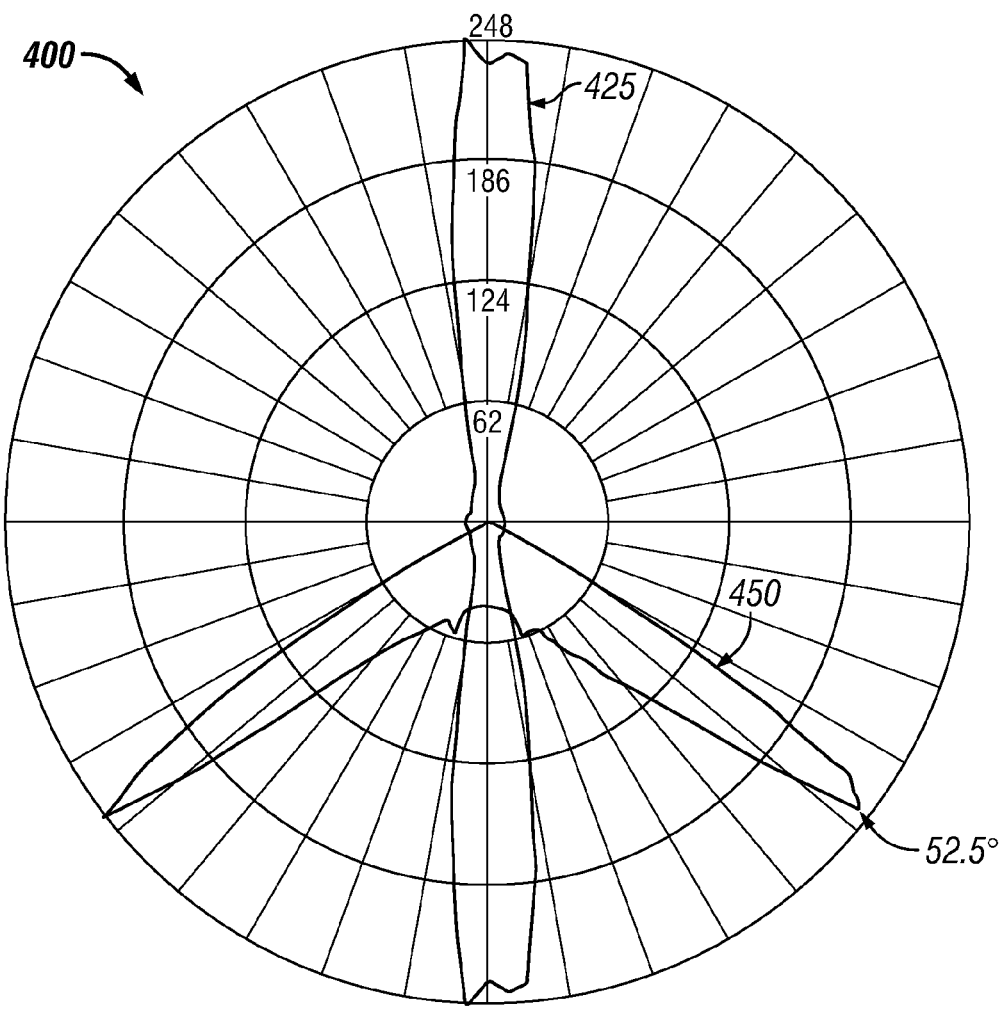
FIGS. 4A and 4B, collectively
Figure 4B:
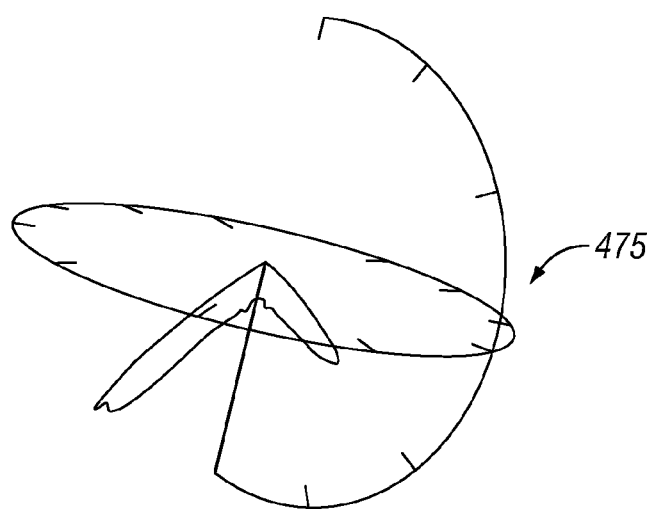

The plot 475 of FIG. 4B presents the intensity profiles of the plots 425 and 450 integrated in a three-dimensional polar or spherical coordinate system. As will be appreciated by one of skill in the art, the three-dimensional polar coordinate system of the plot 475 can be viewed as a polar transformation or equivalent to the three axes 300 of the Cartesian coordinate system illustrated in FIG. 3 and discussed above.

An exemplary embodiment of the optic 200 will now be described in further detail with reference to FIGS. 5-18. FIGS. 5-18 will be discussed as illustrating features present in one, common optic (i.e. the optic 200). However, other embodiments may have features illustrated in one or more of these figures, without necessarily having features illustrated in other figures. For example, while FIGS. 8 and 12 will be discussed as illustrating the top and the bottom of the same optic, another embodiment may have the bottom illustrated in FIG. 8 and a top that is flat or some other form, and yet another embodiment may have the top illustrated in FIG. 12 and a bottom that is flat or some other form. The present disclosure and teaching is sufficiently rich and detailed to enable one of ordinary skill in the art to make and use a wide variety of optic embodiments by combining various features illustrated in the figures and described in text in accordance with principles of the present technology. Moreover, one of ordinary skill will be able to apply the present teaching readily to adapt the various disclosed features according to application parameters and preferences.

Figure 5:
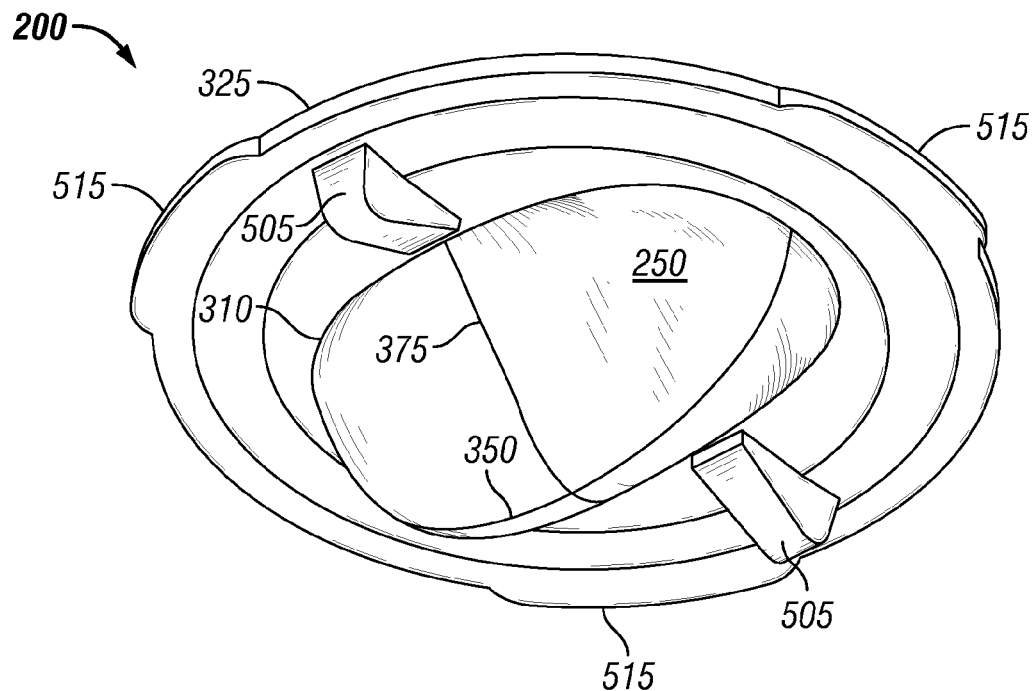
FIG. 5 is a perspective view of an optic for managing light emitted by a light emitting diode, wherein the optic is depicted as opaque to enhance visualization of certain surface features according to certain exemplary embodiments of the present technology.

FIG. 5 illustrates a perspective view of the optic 200, depicted opaque to enhance visualization of certain surface features.

Figure 6:
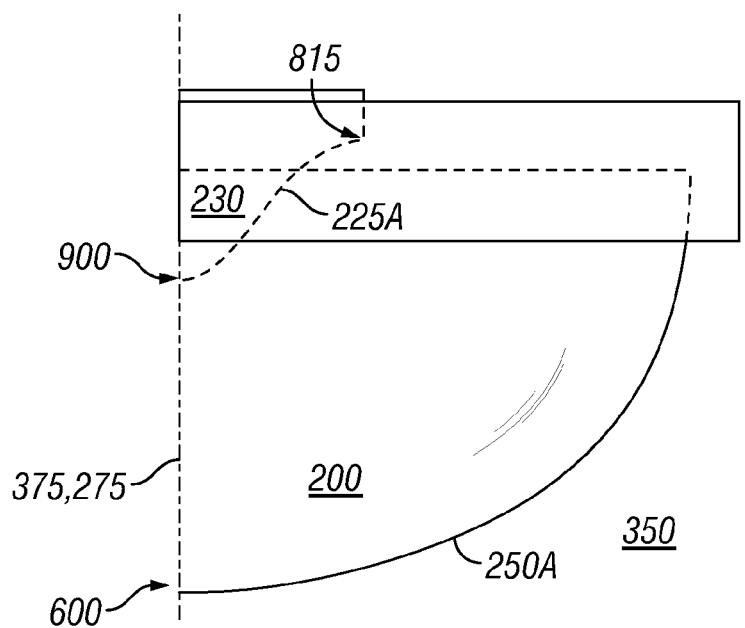
FIG. 6 is a view of an optic in the long axis, for managing light emitted by a light emitting diode, illustrating profiles in a cross sectional plane according to certain exemplary embodiments of the present technology.

FIG. 6 illustrates inner and outer profiles 225A, 250A of the optic 200 in a cross section of the outer plane 350. FIG. 7 illustrates inner and outer profiles 225B, 250B of the optic 200 in a cross section of the inner plane 375.

Figure 8:
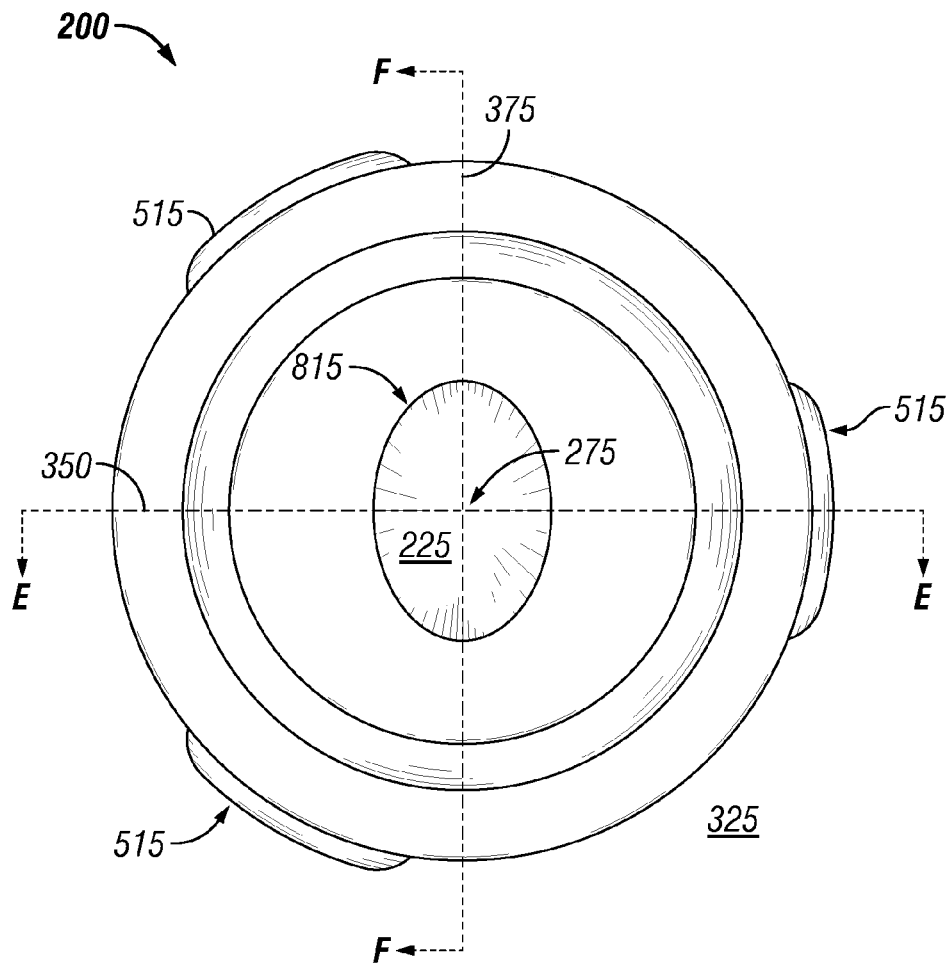
FIG. 8 is a bottom view of an optic for managing light emitted by a light emitting diode according to certain exemplary embodiments of the present technology.

FIG. 8 illustrates a bottom view of the optic 200, with features on the opposite (top or outer) side of the optic 200 hidden. FIG. 9 illustrates the optic 200 in a cross section taken across line E-E of FIG. 8 (corresponding to the outer plane 350) and tabulates exemplary profiles in that cross section. FIG. 10 illustrates the optic 200 in a cross section taken across line F-F of FIG. 8 (corresponding to the inner plane 375) and tabulates exemplary profiles in that cross section.

FIG. 11 illustrates a top view of a central region of the optic 200, wherein features on the opposite, bottom side of the optic 200 are dashed and tabulates exemplary profiles appearing the view.

Figure 12:
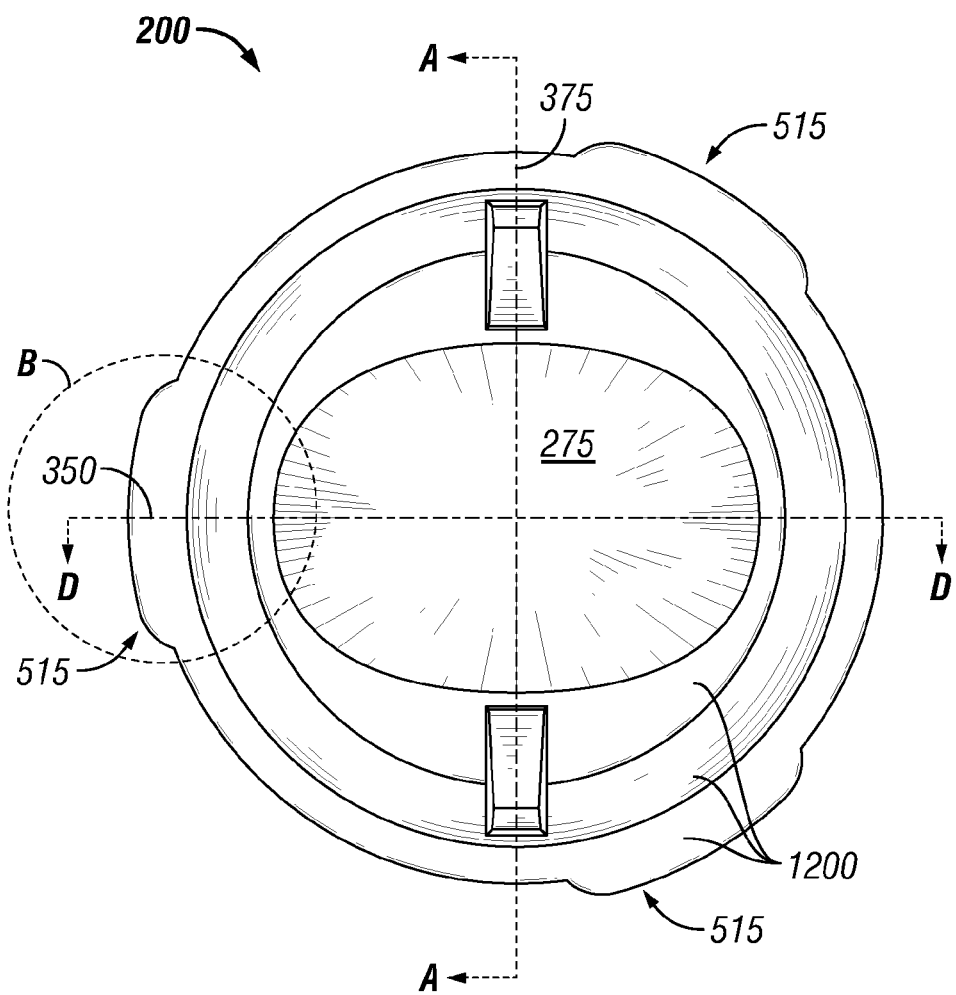
FIG. 12 is a top view of an optic for managing light emitted by a light emitting diode according to certain exemplary embodiments of the present technology.
Figure 13:
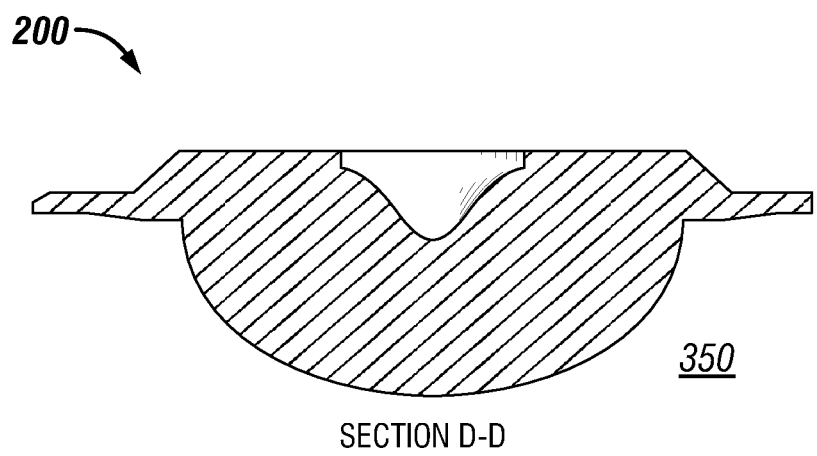
FIG. 13 is a cross sectional view of an optic taken across the line D-D of FIG. 12 according to certain exemplary embodiments of the present technology.
Figure 14:
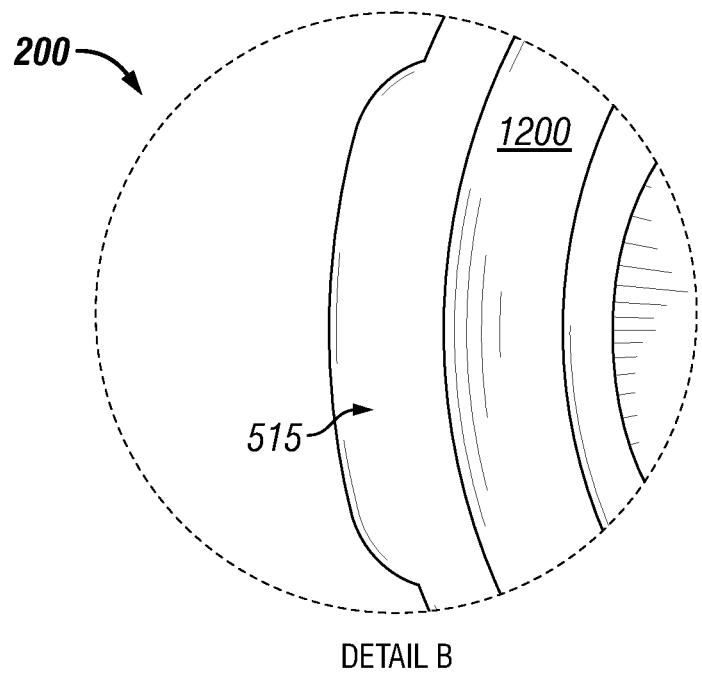
FIG. 14 is a detail view of an optic taken at area B of FIG. 12 according to certain exemplary embodiments of the present technology.
Figure 15:
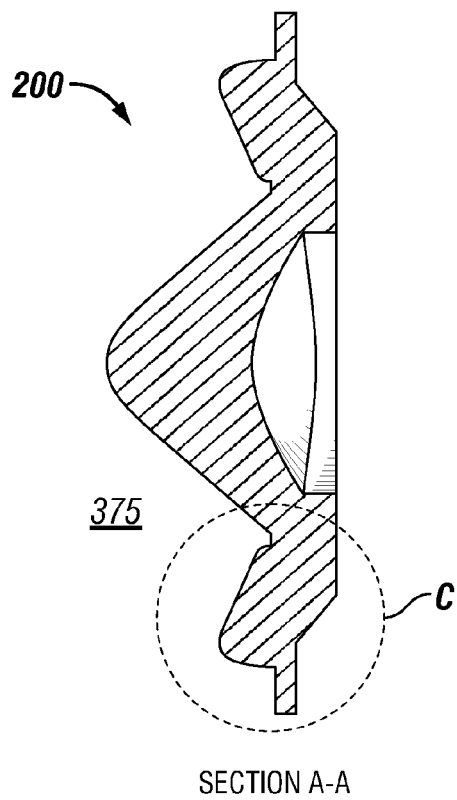
FIG. 15 is a cross sectional view of an optic taken across the line A-A of FIG. 12 according to certain exemplary embodiments of the present technology.
Figure 16:
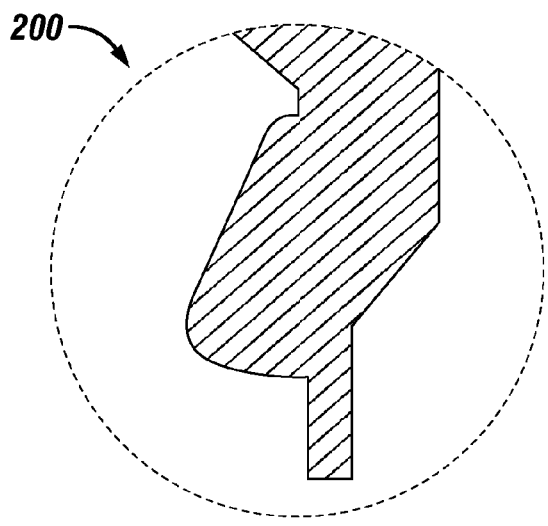
FIG. 16 is a detail view of an optic taken at area C of FIG. 15 according to certain exemplary embodiments of the present technology.

FIG. 12 illustrates a top view of the optic 200, with features on the opposite side (bottom or inner) of the optic 200 hidden. FIG. 13 illustrates a cross sectional view of the optic 200 taken across the line D-D of FIG. 12 (corresponding to the outer plane 350) with exemplary mechanical dimensions. FIG. 14 illustrates a detail view of the optic 200 taken at area B of FIG. 12 with exemplary mechanical dimensions. FIG. 15 illustrates a cross sectional view of the optic 200 taken across the line A-A of FIG. 12 (corresponding to the inner plane 375). FIG. 16 illustrates a detail view of the optic 200 taken at area C of FIG. 15 with exemplary mechanical dimensions.

Figure 17:
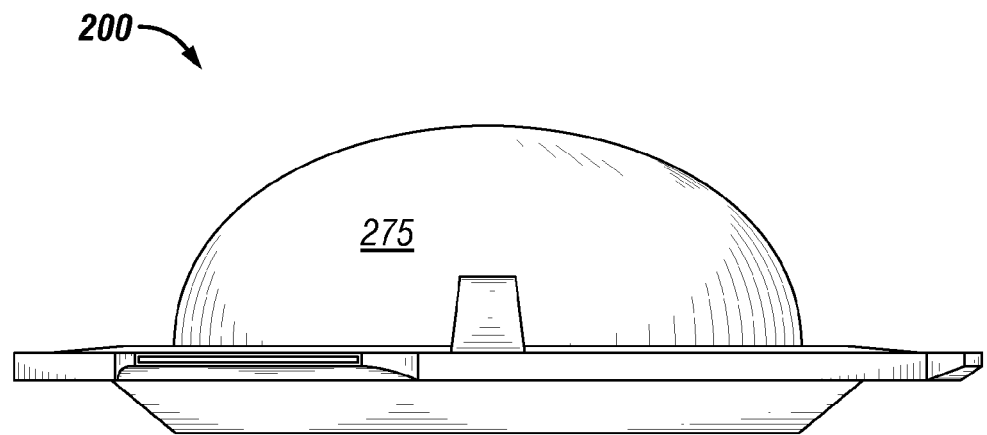
FIG. 17 is a side view of an optic for managing light emitted by a light emitting diode according to certain exemplary embodiments of the present technology.
Figure 18:
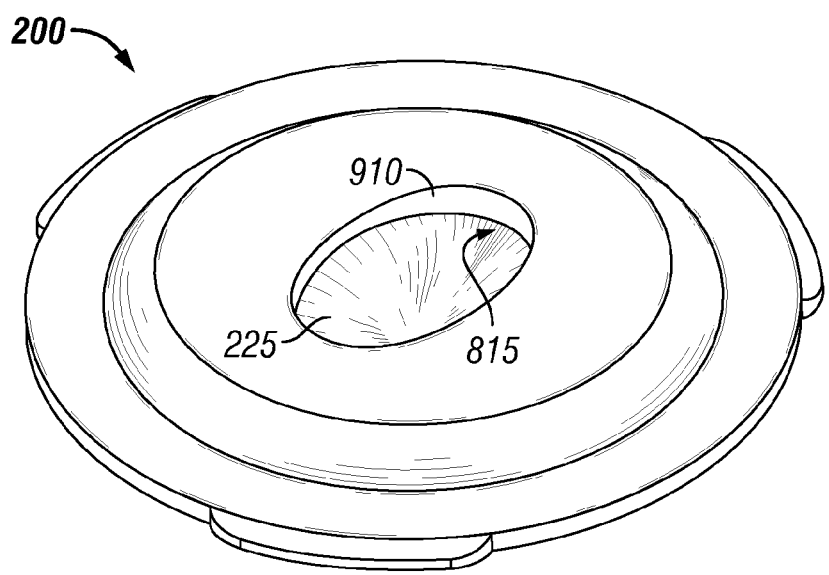
FIG. 18 is a perspective view of an underside of optic for managing light emitted by a light emitting diode according to certain exemplary embodiments of the present technology.

FIG. 17 illustrates a side view of the optic 200. FIG. 18 illustrates a perspective view of the underside (i.e. bottom or inner side) of the optic 200.

Figures 9A, 9B, 9C:
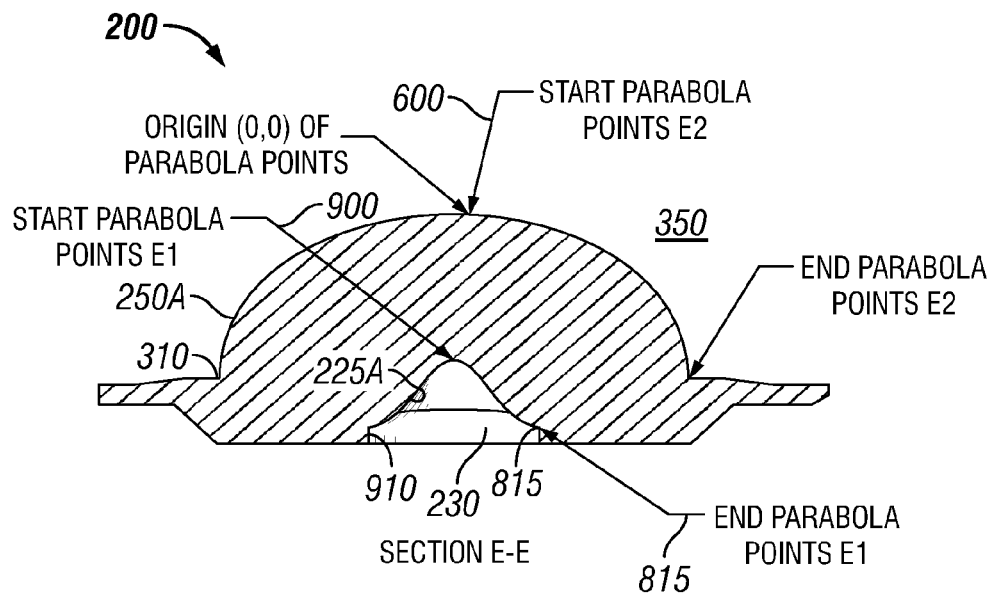
FIGS. 9A, 9B, and 9C, collectively FIG. 9, provide information about an optic for managing light emitted by a light emitting diode, with reference to a cross section taken across line E-E of FIG. 8, according to certain exemplary embodiments of the present technology.

As illustrated in FIGS. 6 and 9A, the intersection of the outer plane 350 with the inner surface 225 defines an inner profile 225A. The inner profile 225A extends from a peak 900 to an inner edge 815, which circumscribes the inner surface 225 in an oblong outline and defines a footprint of the inner surface 225. The table of FIG. 9B provides exemplary coordinates for one embodiment of the inner profile 225A. As can be visualized from FIGS. 6 and 9A, the inner profile 225A sags or droops between the inner edge 815 and the peak 900.

As further illustrated in FIGS. 6 and 9A, the intersection of the outer plane 350 with the outer surface 250 defines an outer profile 250A. The outer profile 250A extends from a peak 600 to the outer edge 310, which circumscribes the outer surface 250 in an oblong outline and defines a footprint of the outer surface 250. The table of FIG. 9C provides exemplary coordinates for one embodiment of the outer profile 250A.

In the illustrated embodiment, the inner profile 225A is more pointy than the outer profile 250A. In certain exemplary embodiments, the outline of the inner edge 815 has a length-to-width ratio that is greater than the length-to-width ratio of the outline of the outer edge 310. In certain other exemplary embodiments, the outline of the inner edge 815 has a length-to-width ratio that is smaller than the length-to-width ratio of the outline of the outer edge 310.

Figure 7A:
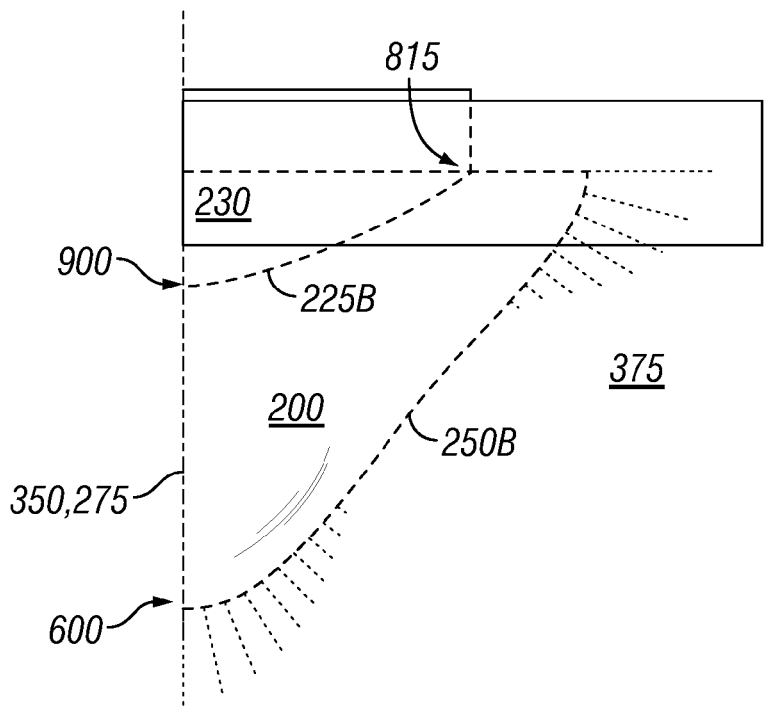
FIGS. 7A and 7B, collectively
Figure 7B:
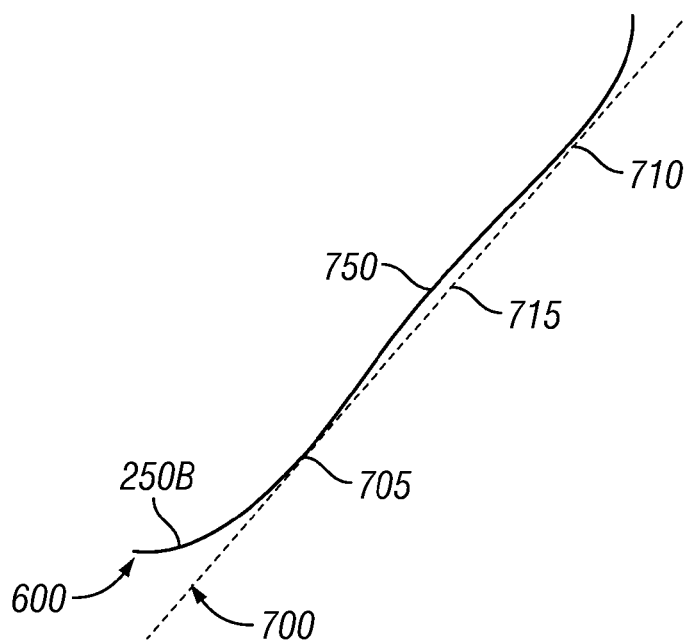
Figures 10A, 10B, 10C:
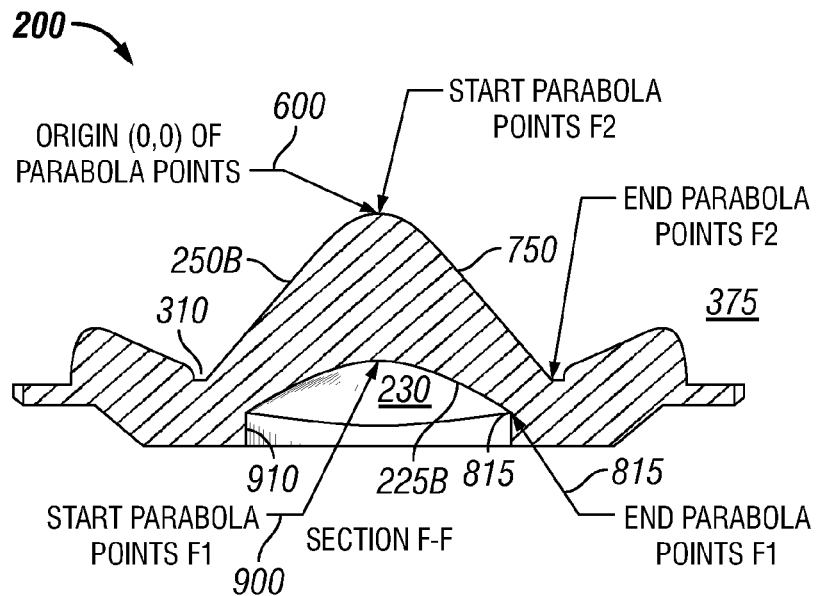
FIGS. 10A, 10B, and 10C, collectively FIG. 10, describe an optic for managing light emitted by a light emitting diode, with reference to a cross section taken across line F-F of FIG. 8, according to certain exemplary embodiments of the present technology.

As illustrated in FIGS. 7A and 10A, the intersection of the inner plane 375 with the inner surface 225 defines an inner profile 225B. The inner profile 225B extends from the inner edge 815 to the peak 900. The table of FIG. 10B provides exemplary coordinates for one embodiment of the inner profile 225B.

As further illustrated in FIGS. 7A and 10A, the intersection of the inner plane 375 with the outer surface 250 defines an outer profile 250B. The outer profile 250B extends from the outer edge 310 to the peak 600. The table of FIG. 10C provides exemplary coordinates for one embodiment of the outer profile 250B.

In the illustrated embodiment, the outer profile 250A is more pointy than the inner profile 225B.

As can be visualized from FIG. 7, the outer profile 250B sags or droops between the outer edge 310 and the peak 600. An imaginary, reference line 700 can be drawn between and tangent to two regions 715, 710 of the outer profile 250B, with both regions 715, 710 off the peak 600 in a common radial direction. Between the region 715 and the region 710, the outer profile 250B can be separated from the line 700 by a gap 715. Accordingly, in the illustrated embodiment, the outer profile 250B (and the outer surface 250) comprises a locally concave region 750 that is laterally offset from the peak 600, from the axis 275, and from the outer plane 350. Thus, while the outer surface 250 is globally convex, it comprises a region 750 of local concavity.

Figures 11A, 11B, 11C:
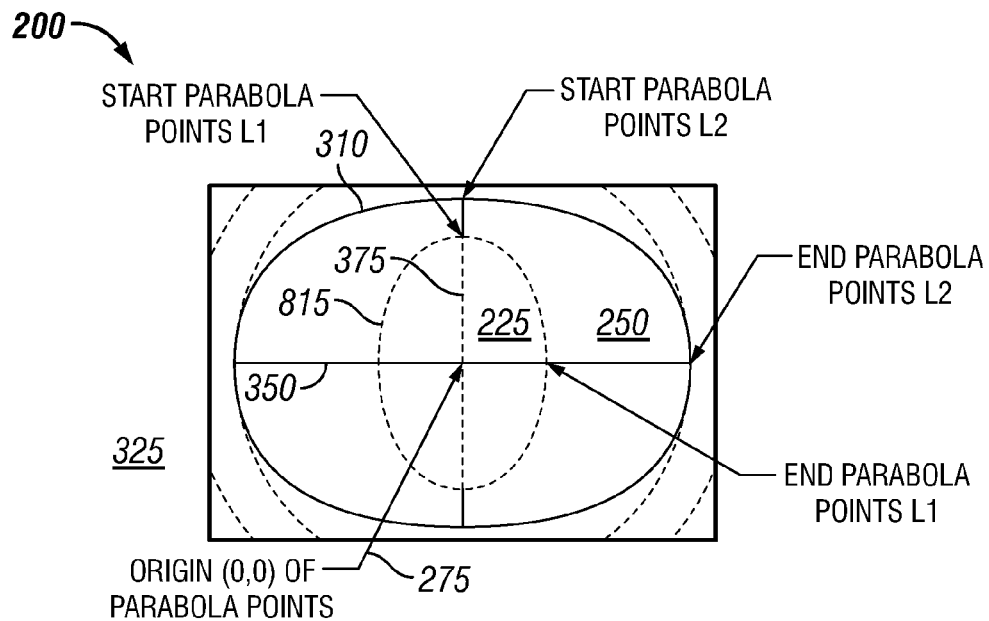
FIGS. 11A, 11B, and 11C, collectively FIG. 11, describe an optic for managing light emitted by a light emitting diode according to certain exemplary embodiments of the present technology.

FIG. 11 further specifies an embodiment of the inner and outer surfaces 225, 250. The table of FIG. 11B specifies a representative geometric form for the inner edge 815. Areas of the inner surface 225 between the inner profile 225A specified in FIG. 9B, the inner profile 225B specified in FIG. 10B, and the inner edge 815 can be specified as a smooth progression or as a family of interpolated curves.

The table of FIG. 11C specifies a representative geometric form for the outer edge 310. Areas of the outer surface 250 between the outer profile 250A specified in FIG. 9C, the outer profile 250B specified in FIG. 10C, and the outer edge 310 can be specified as a smooth progression or as a family of interpolated curves. Accordingly, the figures and accompanying description fully define an embodiment of the optic 200, including complete contour specifications of the optical surfaces of the optic 200.

In collaboration with features whose leading role is manipulating light, the optic 200 comprises a flange area 1200 and three capture tabs 515, as shown in FIG. 12. The flange area 1200 and capture tabs 515 facilitate mounting via insertion in a matching receptacle. Such a receptacle can comprise a plate having a hole sized to receive the diameter of the flange area 1200 and three slots extending radially from the hole to receive the capture tabs 515. The optic 200 can thus be inserted in the hole of the receptacle with the capture tabs 515 aligned to the three slots. The optic 200 can be rotated in the receptacle by applying rotational force to the two turning tabs 505, shown in FIG. 5. Following rotation of the optic 200 (either by hand, hand tool, or assembly machine), the capture tabs 515 seat under the plate (just beyond the hole periphery), thereby capturing the optic 200 in the receptacle. The turning tabs 505 can further facilitate rotating the optic 200 to direct light in a particular direction, such as to match the pathway 150, and/or to provide alignment among optics 200 in a one- or two-dimensional array of light emitting diodes and associated optics 200 of a lighting fixture.

Technology for managing light emitted from a light emitting diode or other source has been described. From the description, it will be appreciated that an embodiment of the present technology overcomes the limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art. Therefore, the scope of the present technology is to be limited only by the claims that follow.

What is claimed is:

1. An optic comprising:
an inner side that rises with respect to a plane to form a cavity sized for receiving light from a light emitting diode, the cavity extending along the plane in two dimensions, farther in a first dimension than in a second dimension; and
an outer side that rises with respect to the plane to form a light emitting surface that extends along the plane in the two dimensions, farther in the second dimension than in the first dimension,
wherein the inner side comprises a first contour along the first dimension and a second contour along the second dimension,
wherein the light emitting surface comprises a third contour along the first dimension and a fourth contour along the second dimension,
wherein the second contour is concave, comprises a first peak, and sags on opposing sides of the first peak,
wherein the first contour is concave without sagging on opposing sides of the first peak,
wherein the third contour is convex, comprises a second peak, and sags on opposing sides of the second peak, and
wherein the fourth contour is convex without sagging on opposing sides of the second peak.

2. The optic of claim 1, wherein the cavity extends in the first dimension at least about twice as far as the cavity extends in the second dimension.

3. The optic of claim 1, wherein the light emitting surface has a first outline, and
wherein the cavity has a second outline that is substantially smaller than the first outline.

4. The optic of claim 1, wherein the light emitting surface has a first length-to-width ratio, and
wherein the cavity has a second length-to-width ratio that is greater than the first length-to-width ratio.

5. The optic of claim 1, wherein the third contour is substantially more pointy than the fourth contour.

6. An optic comprising:
a cavity sized to receive a dome of a light emitting diode and comprising an inner surface that rises above a first reference plane and that is intersected by a second reference plane along a first curve and by a third reference plane along a second curve, wherein the first, second, and third reference planes are perpendicular to one another; and
a refractive outer surface opposite the inner surface, the refractive outer surface rising above the first reference plane and extending over the cavity,
wherein the second reference plane intersects the refractive outer surface along a third curve that comprises a first peak,
wherein the third reference plane intersects the refractive outer surface along a fourth curve that comprises the first peak,
wherein the third curve sags while continuously rising above the first reference plane to the first peak, and the fourth curve continuously rises above the first reference plane to the first peak without sagging,
wherein the first and second curves comprise a second peak, and
wherein second curve sags while continuously rising above the first reference plane to the second peak, and the first curve continuously rises above the first reference plane to the second peak without sagging.

7. The optic of claim 6, wherein an edge of the refractive outer surface is oblong, and
wherein the refractive outer surface is smooth.

8. The optic of claim 6, wherein the cavity has an oblong outline along the first reference plane.

9. The optic of claim 6, wherein a plan view of the optic shows the cavity as elongate in a first direction and shows the refractive outer surface as elongate in a second direction that is perpendicular to the first direction.

10. The optic of claim 6, wherein the cavity is sized such that when the dome is received, a limited portion of the dome extends into the cavity,
wherein the optic is substantially symmetrical with respect to the second reference plane, and
wherein the optic is substantially symmetrical with respect to the third reference plane.

11. The optic of claim 6, wherein an intersection between the second reference plane and the third reference plane defines an optical axis of the optic, and
wherein cavity volume is substantially greater than dome volume.

12. An optic comprising:
an inner surface defining a cavity configured for coupling to a light emitting diode and comprising a periphery that is elongated in a dimension; and
an outer surface, opposite the cavity, comprising another periphery that is elongated perpendicular to the dimension,
wherein, in a first cross section of the optic taken along the dimension, the inner surface continuously rises from an inner edge to a first peak without sagging, and the outer surface continuously rises from an outer edge to a second peak and sags between the outer edge and the second peak, and
wherein, in a second cross section of the optic taken perpendicular to the first cross section, the inner surface continuously rises from the inner edge to the first peak and sags between the inner edge and the first peak, and the outer surface continuously rises from the outer edge to the second peak without sagging.

13. The optic of claim 12, wherein the periphery forms an oblong edge,
wherein the another periphery forms another oblong edge,
wherein the outer surface is smooth, and
wherein the cavity is smooth.

14. The optic of claim 12, wherein the optic comprises an axis,
wherein the outer surface is globally convex, and
wherein the outer surface comprises a locally concave region disposed off the axis.

15. The optic of claim 12, wherein the optic comprises an axis,
wherein the outer surface is smooth in a radial direction and comprises:
a first region disposed off the axis in the radial direction;
a second region disposed farther off the axis in the radial direction than the first region; and
a third region disposed off the axis in the radial direction, between the first region and the second region,
wherein an imaginary line extends between the first region and the second region, is tangent to the first region, and is tangent to the second region, and
wherein there is a gap between the third region and the imaginary line.

16. The optic of claim 12, wherein the cavity is smooth and substantially symmetrical with respect to a reference plane, and
    wherein the outer surface is smooth and substantially symmetrical with respect to the reference plane.

17. The optic of claim 12, wherein the periphery of the cavity has a first length-to-width ratio, and
    wherein the another periphery of the outer surface has a second length-to-width ratio that is smaller than the first length-to-width ratio.

18. The optic of claim 12, wherein the inner surface and the outer surface are operative to convert a Lambertian distribution of light from the light emitting diode into an narrow illumination distribution that extends perpendicular to the dimension and comprises a centrally located waist.

\* \* \* \* \*